(12) United States Patent
Lawrence

(10) Patent No.: US 12,122,438 B2
(45) Date of Patent: Oct. 22, 2024

(54) LOAD TRANSPORTER

(71) Applicant: Dorel Home Furnishings, Inc., Wright City, MO (US)

(72) Inventor: Kyle J. Lawrence, Greenfield, IN (US)

(73) Assignee: Dorel Home Furnishings, Inc., Wright City, MO (US)

( * ) Notice: Subject to any disclaimer, the term of this patent is extended or adjusted under 35 U.S.C. 154(b) by 378 days.

(21) Appl. No.: 17/563,366

(22) Filed: Dec. 28, 2021

(65) Prior Publication Data

US 2022/0204063 A1    Jun. 30, 2022

Related U.S. Application Data

(60) Provisional application No. 63/227,995, filed on Jul. 30, 2021, provisional application No. 63/131,610, filed on Dec. 29, 2020.

(51) Int. Cl.
*B62B 1/12* (2006.01)
*B62B 1/00* (2006.01)

(52) U.S. Cl.
CPC ............... *B62B 1/12* (2013.01); *B62B 1/002* (2013.01)

(58) Field of Classification Search
CPC ........ B62B 1/12; B62B 1/002; B62B 2301/10
See application file for complete search history.

(56) References Cited

U.S. PATENT DOCUMENTS

| | | |
|---|---|---|
| 729,931 A | 6/1903 | Hart |
| 1,201,957 A * | 10/1916 | Hall ................... B62B 1/12 |
| | | 280/47.27 |
| 1,341,171 A * | 5/1920 | Hall ................... B62B 1/12 |
| | | 280/47.27 |
| 2,363,619 A | 11/1944 | Prieto |
| 2,447,582 A | 8/1948 | Klumb |
| 2,458,922 A | 1/1949 | Andresen |
| 2,598,168 A | 5/1952 | Hooz et al. |
| 2,650,834 A | 9/1953 | Coval |
| 2,786,692 A | 3/1957 | Timpson |
| 2,680,026 A | 6/1957 | Cushman |
| 2,885,720 A | 5/1959 | Seeberger |
| 3,356,386 A | 12/1967 | Taylor |
| 3,785,669 A | 1/1974 | Doheny |
| 4,227,709 A | 10/1980 | Gradwohl et al. |
| 4,358,124 A | 11/1982 | Geschwender |
| 4,413,833 A * | 11/1983 | Tucker ................. B62B 1/14 |
| | | 280/47.22 |
| 4,659,096 A | 4/1987 | Leimgruber |
| 4,681,330 A | 7/1987 | Misawa |

(Continued)

FOREIGN PATENT DOCUMENTS

| | | |
|---|---|---|
| CN | 2053180 U | 2/1990 |
| CN | 103612651 A | 3/2014 |

(Continued)

*Primary Examiner* — James A Shriver, II
*Assistant Examiner* — Ian Bryce Shelton
(74) *Attorney, Agent, or Firm* — Barnes & Thornburg LLP

(57) ABSTRACT

A load transporter includes a wheel unit and a load support coupled to the wheel unit. The wheel unit is configured to allow the load transporter to roll across a surface while the load support supports an object above the surface. The load transporter is configured to change from an upright orientation to a laid-back orientation where the load support lifts the object above the surface for transportation.

20 Claims, 10 Drawing Sheets

(56) References Cited

U.S. PATENT DOCUMENTS

| | | | |
|---|---|---|---|
| 4,762,333 A | 8/1988 | Mortenson | |
| 4,802,681 A | 2/1989 | Hung | |
| 4,921,270 A | 5/1990 | Schoberg | |
| 5,118,205 A | 6/1992 | Hoffman | |
| 5,347,680 A | 9/1994 | Rippe | |
| 5,476,282 A | 12/1995 | Dahl | |
| 5,536,034 A | 7/1996 | Miller | |
| 5,542,509 A | 8/1996 | Bell | |
| 5,709,400 A | 1/1998 | Bonnier et al. | |
| 5,779,251 A | 7/1998 | Meier | |
| 5,810,373 A | 9/1998 | Miranda | |
| 5,855,378 A | 1/1999 | Capehart | |
| 6,053,515 A | 4/2000 | Kelley | |
| 6,142,032 A | 11/2000 | Creager | |
| 6,237,925 B1 * | 5/2001 | Koenig | B62B 1/12 280/47.28 |
| 6,273,438 B1 * | 8/2001 | Prapavat | B62B 1/002 280/47.21 |
| 6,308,967 B1 | 10/2001 | Stallbaumer et al. | |
| 6,328,319 B1 | 12/2001 | Stahler | |
| 6,357,077 B1 | 3/2002 | Jones, Jr. et al. | |
| 6,364,328 B1 | 4/2002 | Stahler | |
| 6,419,244 B2 | 7/2002 | Meabon | |
| 6,460,641 B1 | 10/2002 | Kral | |
| 6,557,869 B2 * | 5/2003 | Gillette | B62B 1/12 414/490 |
| 6,851,685 B2 | 2/2005 | Koenig | |
| 6,880,835 B2 | 4/2005 | Tornabene et al. | |
| 6,945,545 B2 | 9/2005 | Celli | |
| 7,168,712 B2 | 1/2007 | Celli | |
| 7,740,250 B2 | 6/2010 | Muller et al. | |
| 8,100,430 B2 | 1/2012 | Meyers et al. | |
| 8,413,999 B2 | 4/2013 | Nassaux et al. | |
| D707,415 S | 6/2014 | Carlson et al. | |
| 8,764,046 B2 | 7/2014 | Baldemor et al. | |
| 8,770,598 B2 | 7/2014 | Li | |
| 8,820,773 B1 | 9/2014 | Ferree, Jr. | |
| 8,910,970 B2 | 12/2014 | Chen | |
| 9,321,471 B1 | 4/2016 | Gedeon-Janvier | |
| 9,358,994 B1 * | 6/2016 | Yang | B62B 1/12 |
| 9,365,225 B2 | 6/2016 | Henao | |
| RE46,150 E | 9/2016 | Liao | |
| 9,616,907 B1 | 4/2017 | Gibson | |
| 9,637,149 B1 | 5/2017 | Wang | |
| 9,688,298 B1 | 6/2017 | Su | |
| 9,969,411 B2 | 5/2018 | Belotti et al. | |
| 10,023,212 B2 * | 7/2018 | Ludo | B62B 1/12 |
| 10,118,633 B2 | 11/2018 | Gibson | |
| 10,160,467 B2 | 12/2018 | Josephsen | |
| 10,426,265 B2 | 10/2019 | Li | |
| 10,448,536 B2 * | 10/2019 | Dlugosz | B62B 1/10 |
| 10,575,432 B1 * | 2/2020 | Dlugosz | H05K 7/186 |
| 10,864,933 B2 | 12/2020 | Mendoza | |
| 2002/0003368 A1 | 1/2002 | VanDeRiet et al. | |
| 2002/0030351 A1 * | 3/2002 | Gillette | B62B 1/12 280/652 |
| 2004/0090027 A1 | 5/2004 | Koenig | |
| 2004/0256818 A1 | 12/2004 | Amsili | |
| 2005/0161916 A1 | 7/2005 | Taylor | |
| 2007/0080512 A1 | 4/2007 | Bartholmey et al. | |
| 2007/0272454 A1 | 11/2007 | Muller et al. | |
| 2008/0073869 A1 | 3/2008 | Patterson | |
| 2010/0270763 A1 | 10/2010 | Nassaux et al. | |
| 2011/0268505 A1 | 11/2011 | Ebbenga et al. | |
| 2012/0038123 A1 | 2/2012 | Li | |
| 2012/0153585 A1 | 6/2012 | Ryan et al. | |
| 2012/0153587 A1 | 6/2012 | Ryan et al. | |
| 2012/0286498 A1 | 11/2012 | Baldemor et al. | |
| 2012/0313351 A1 | 12/2012 | Chen | |
| 2013/0127138 A1 | 5/2013 | Ferree, Jr. | |
| 2016/0368515 A1 | 12/2016 | Belotti et al. | |
| 2017/0015140 A1 | 1/2017 | Sekine et al. | |
| 2017/0057530 A1 * | 3/2017 | Ludo | B62B 1/12 |
| 2018/0098625 A1 | 4/2018 | Li | |
| 2020/0045844 A1 * | 2/2020 | Dlugosz | H05K 7/186 |
| 2020/0156682 A1 | 5/2020 | Martin | |
| 2023/0001970 A1 | 1/2023 | Omar et al. | |

FOREIGN PATENT DOCUMENTS

| | | | |
|---|---|---|---|
| CN | 113002599 A | 6/2021 | |
| DE | 196751061 U | 1/1969 | |
| EP | 1086875 A1 | 3/2001 | |
| FR | 2663600 A1 | 12/1991 | |
| GB | 601193 A | 4/1948 | |
| JP | S5437671 U | 3/1979 | |
| SU | 1240672 A1 * | 6/1986 | |
| TW | I541157 B | 7/2016 | |
| WO | WO-0063058 A1 * | 10/2000 | B62B 1/12 |
| WO | WO-0194181 A1 * | 12/2001 | B62B 1/12 |
| WO | WO-02096738 A1 * | 12/2002 | B62B 1/10 |
| WO | WO-2007070950 A1 * | 6/2007 | B62B 1/10 |
| WO | 2010090829 A1 | 8/2010 | |
| WO | WO-2015167322 A1 * | 11/2015 | B62B 1/12 |
| WO | 2018189512 A1 | 10/2018 | |
| WO | WO-2019118634 A1 * | 6/2019 | A47B 91/002 |

* cited by examiner

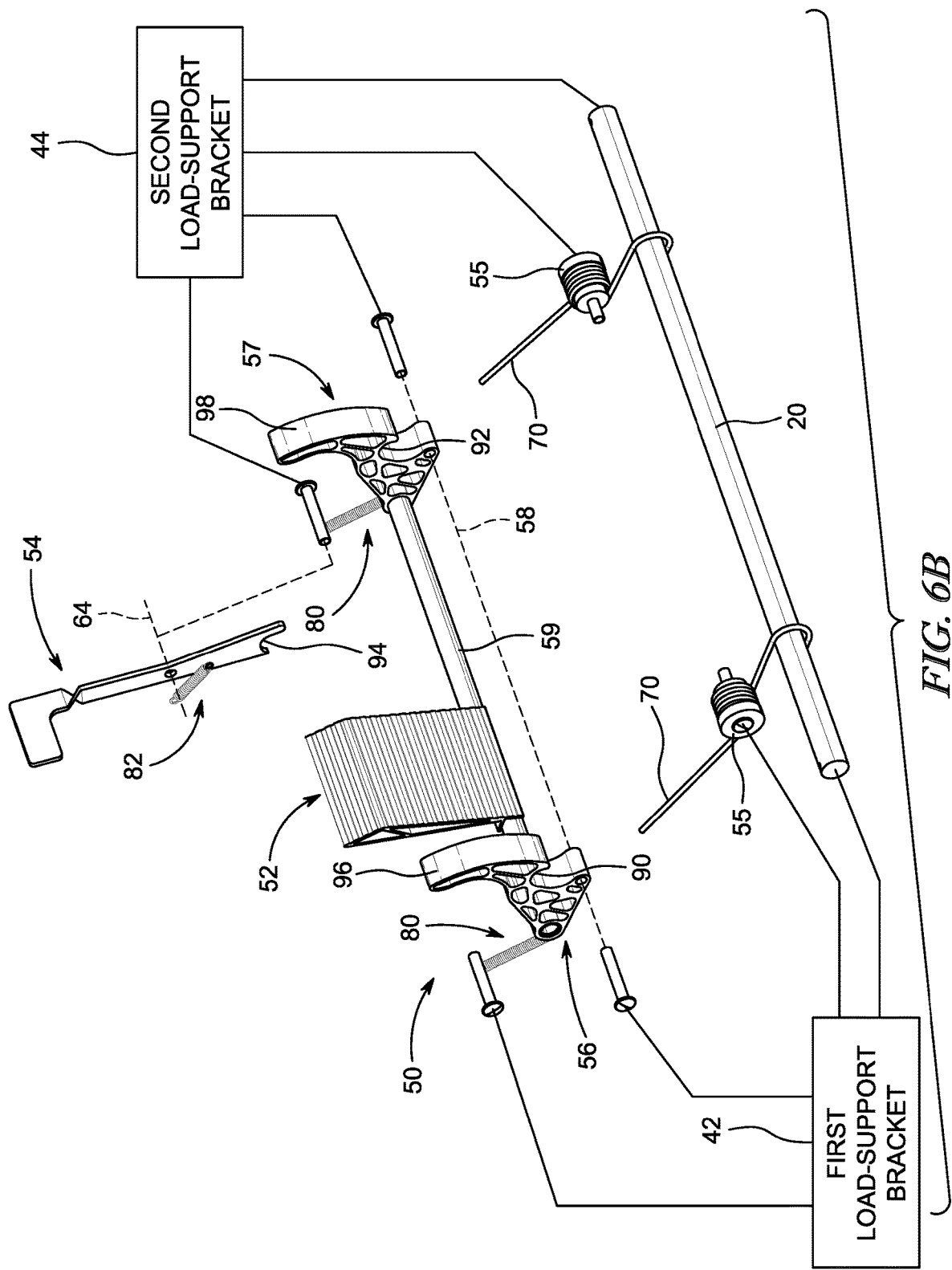

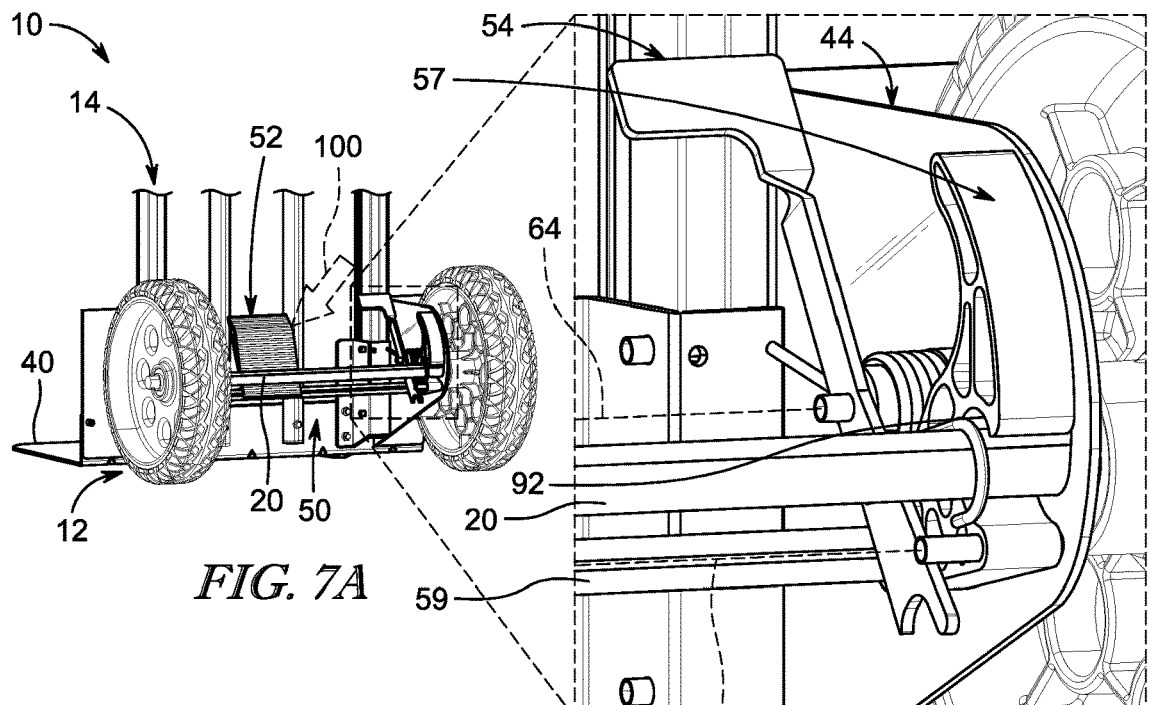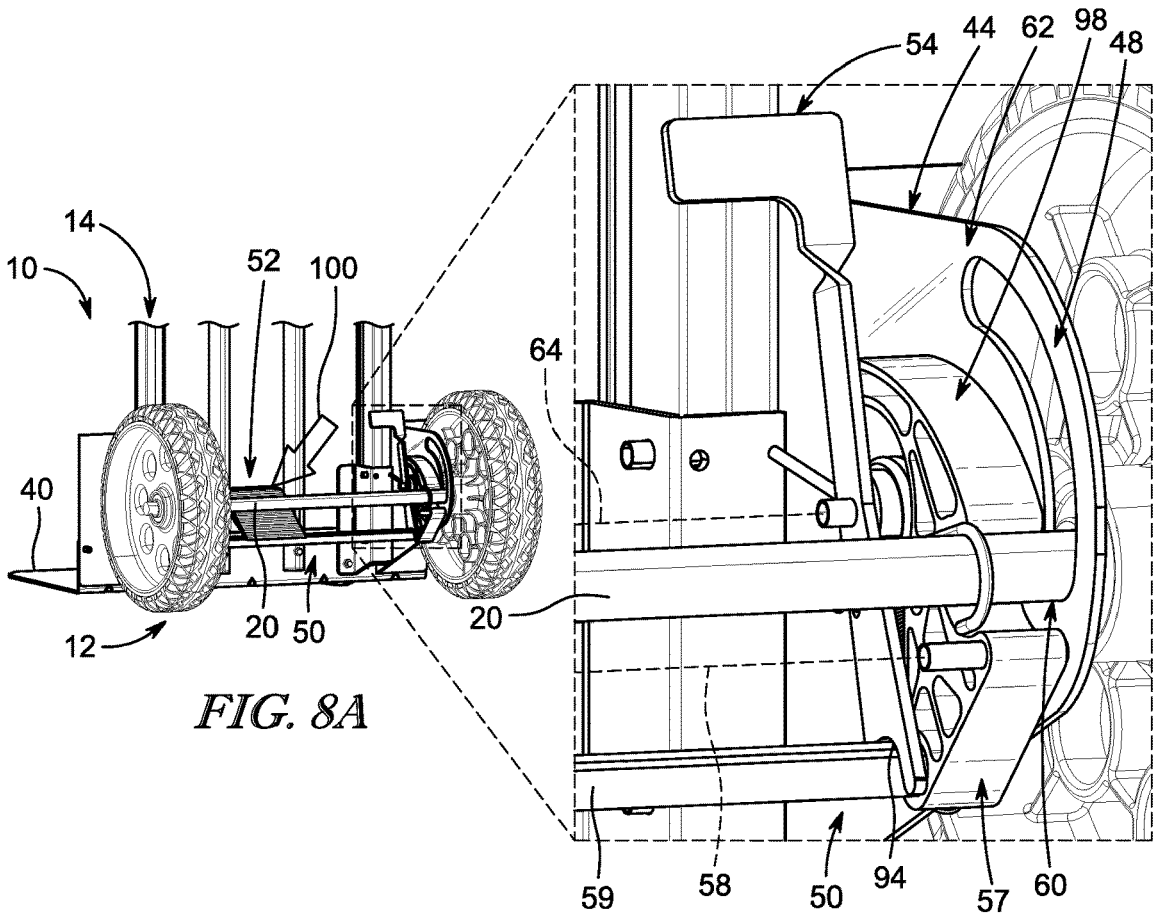

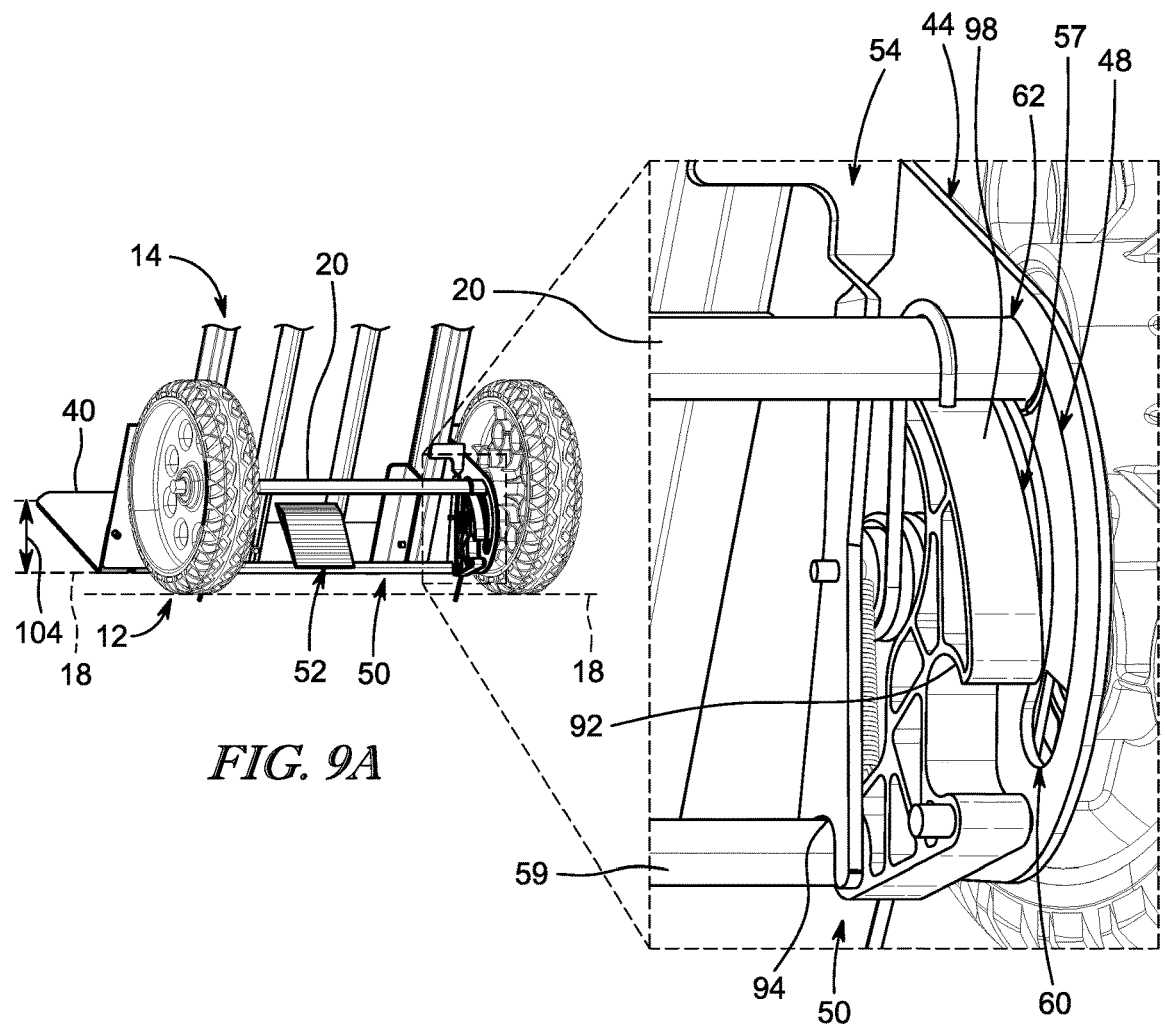
FIG. 9A
FIG. 9B
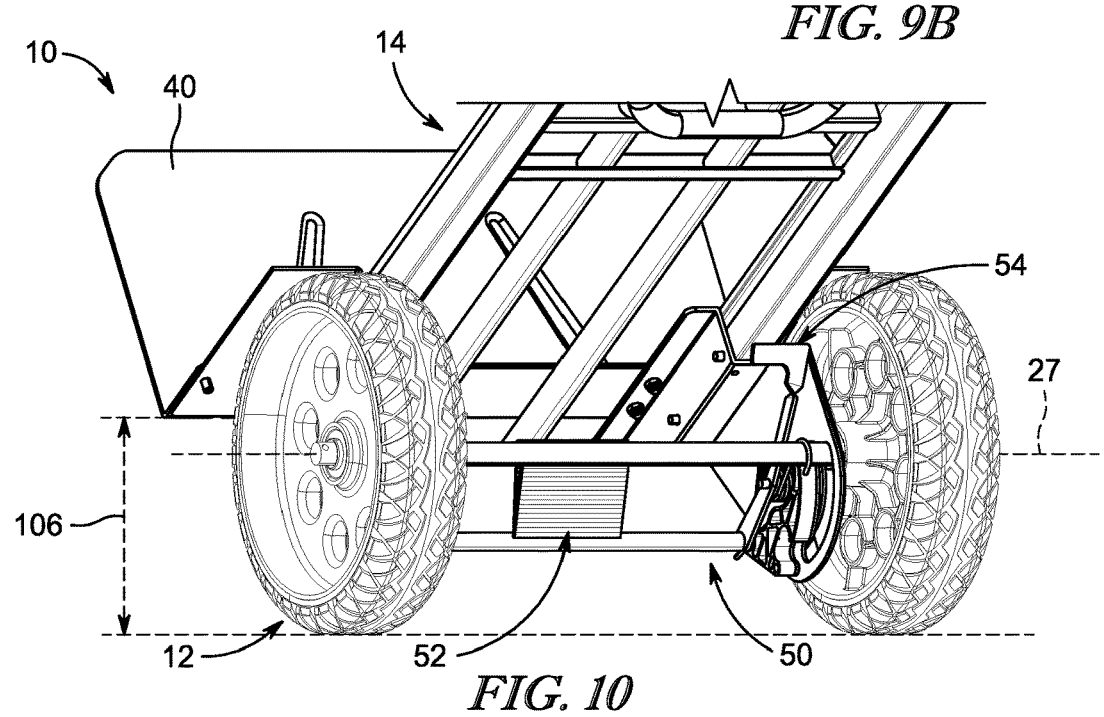
FIG. 10

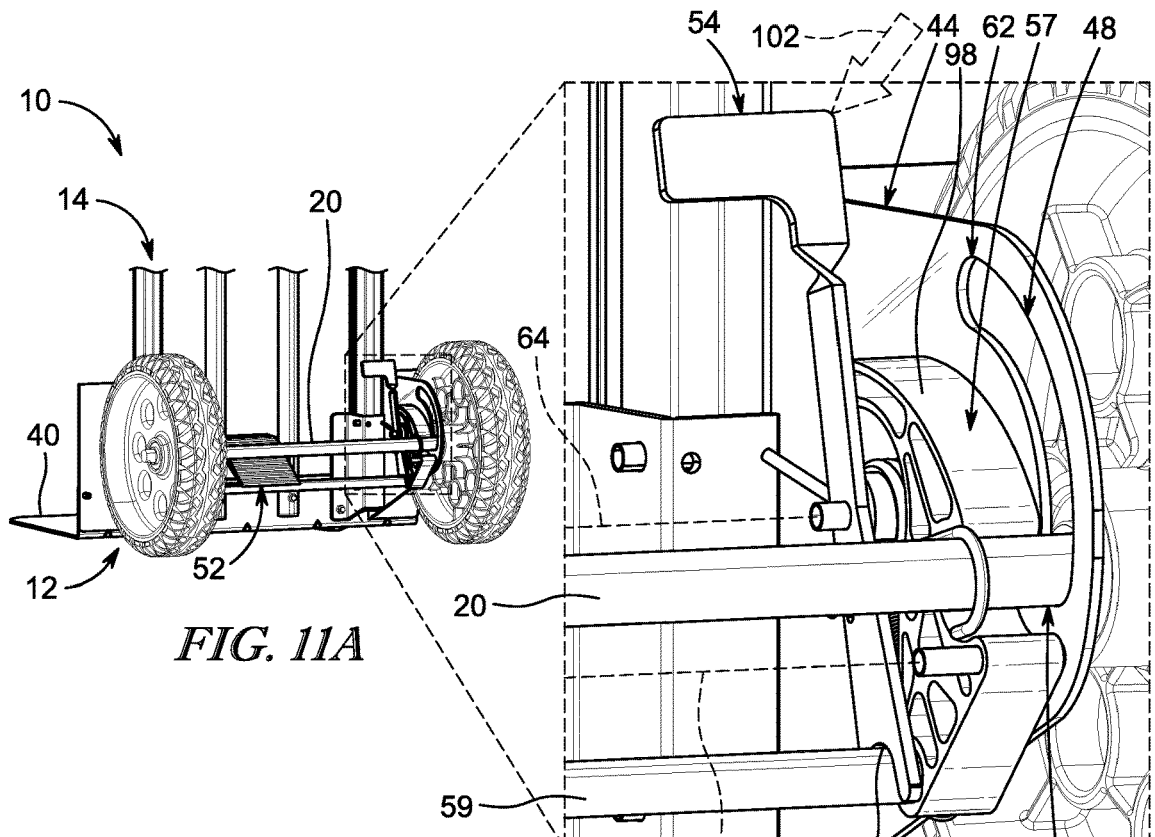
FIG. 11A
FIG. 11B
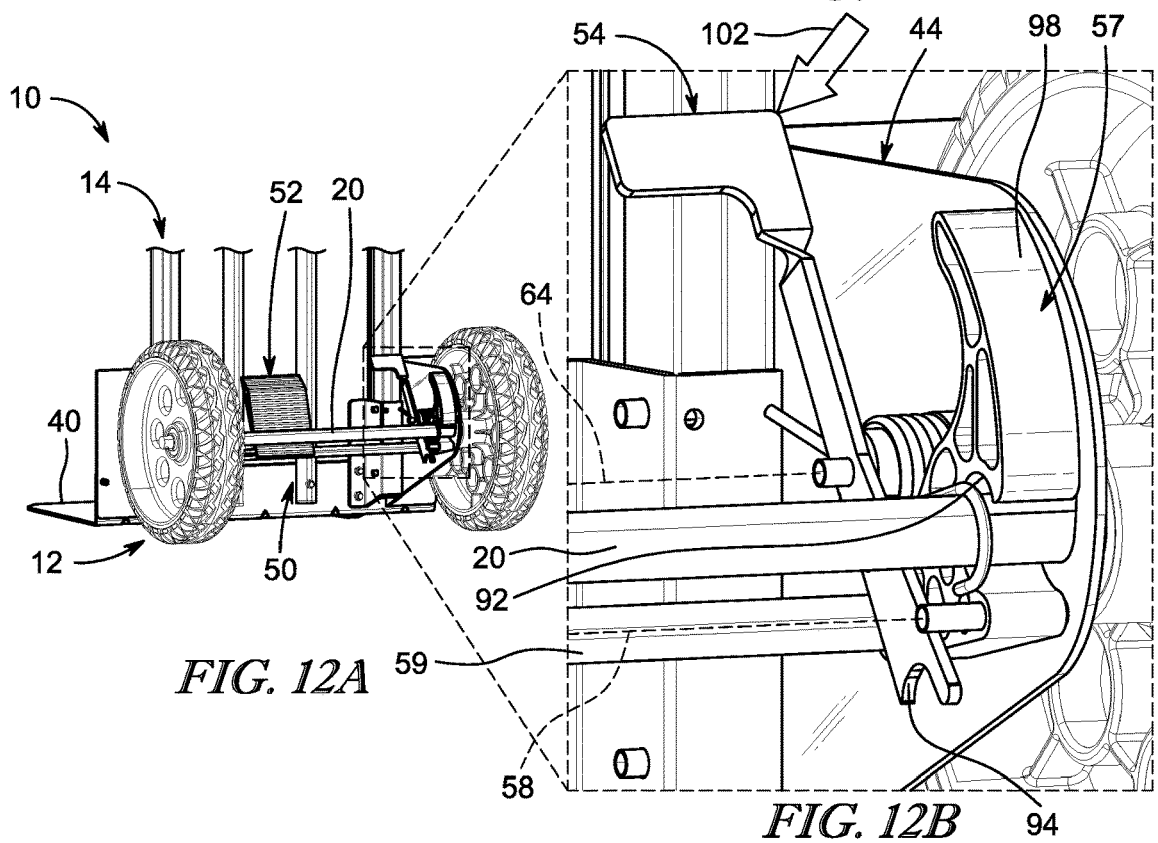
FIG. 12A
FIG. 12B ial Application Ser. No. 63/227,995, filed Jul. 30, 2021, and to U.S. Provisional Application Ser. No. 63/131,610, filed Dec. 29, 2020, each of which is expressly incorporated by reference herein.

LOAD TRANSPORTER

PRIORITY CLAIM

This application claims priority under 35 U.S.C. § 119(e) to U.S. Provisional Application Ser. No. 63/227,995, filed Jul. 30, 2021, and to U.S. Provisional Application Ser. No. 63/131,610, filed Dec. 29, 2020, each of which is expressly incorporated by reference herein.

BACKGROUND

The present disclosure relates to a load transporter and particularly to a load transporter with wheels and a toe plate. More particularly, the present disclosure relates to a load transporter that is reconfigurable to assist a user.

SUMMARY

According to the present disclosure, a load transporter includes a wheel unit and a load support coupled to the wheel unit. The wheel unit is configured to allow the load transporter to roll across a surface while the load support holds an object above the surface. The load transporter may be tilted from an upright orientation to lift objects above the surface for transportation.

In illustrative embodiments, the load transporter further includes mode change means for changing the load transporter from a NORMAL LIFT mode to a LOAD-ASSIST mode. In the NORMAL LIFT mode, the load support is kept fixed relative to the wheel unit as the load transporter is tilted from the upright orientation to lift an object. In the LOAD-ASSIST mode, the load support pivots about a load-assist axis relative to the wheel unit from the upright orientation to a first-stage, laid-back orientation and then to a second-stage, laid-back orientation. In the first-stage, laid-back orientation, a front end of the toe plate is lifted away from the surface and a rear end of the toe plate remains planted on the surface. After reaching the first-stage, laid-back orientation, the load support can pivot about a wheel axis spaced apart from the load-assist axis to the second stage, laid-back orientation. In the second-stage, laid-back orientation, the rear end of the toe plate is lifted off the surface so that the wheel unit can roll across the surface and transport the object.

In illustrative embodiments, the mode change means includes a mode changer that is coupled to the load support. The mode changer includes an axle retainer and a load-assist activation pedal coupled to the axle retainer. The axle retainer is coupled to the load support for pivotable movement about the load assist pivot axis between an engaged position and a disengaged position upon receipt of an activation force on the load-assist activation pedal. In the engaged position, the axle retainer is configured to engage the wheel unit and block the load support from moving relative to the wheel unit so that the load transporter is retained in the NORMAL LIFT mode. In the disengaged position, the mode changer is spaced apart from the wheel unit to place the load transporter in the LOAD-ASSIST mode so that the load support is free to move relative to the wheel unit when the load transporter is tilted from the upright orientation to the first-stage, laid-back orientation.

In illustrative embodiments, the mode changer may further include a load-assist release pedal. The load-assist release pedal is configured to engage the axle retainer in the disengaged position and to block movement of the axle retainer from the disengaged position to the engaged position until an operator applies a release force on the load-assist release pedal.

Additional features of the present disclosure will become apparent to those skilled in the art upon consideration of the following detailed description exemplifying the best mode of carrying out the disclosure as presently perceived.

BRIEF DESCRIPTION OF THE DRAWINGS

The detailed description particularly refers to the accompanying figures in which:

FIG. 2 is a side cross-section taken along line 2-2 in FIG. 1 showing the load transporter in the upright orientation with an object supported on the toe plate of the load support and the mode changer in the engaged position prior to the a load-assist activation pedal being pressed inwardly toward the toe plate by a user to disengage the axle so that the axle is free to pivot about a load-assist axis through the arcuate slot as the load transporter is tilted rearwardly from the upright orientation to the first-stage, laid back position, and showing that a first distance is established between a load-support reference plane aligned with an underside of a support frame of the load support and a spaced-apart first wheel-axle reference plane aligned with the axle and arranged parallel with the load-support reference plane, and a second distance defined between a toe-plate shelf reference axis that is aligned with an upper surface of the toe plate and a spaced-apart second wheel-axle reference plane that is aligned with the axle and arranged parallel with the toe-plate shelf reference axis;

FIG. 3 is a side cross-section of the load transporter in the first-stage, laid-back orientation showing that the load support has moved relative to the wheel unit to the first-stage laid-back orientation to cause the first distance to decrease and the second distance to increase so that a center of gravity of the object shifts rearwardly toward the wheel unit while a rear end of the toe plate remains planted on the surface underlying the load transporter thereby facilitating lifting of the rear end of the toe plate and the object completely off the ground as shown in FIGS. 5C and 10;

FIG. 4A is a side elevation and diagrammatic view of a portion of the load transporter in the upright orientation and suggesting that the mode changer is arranged in the engaged position to block movement of the load support relative to the wheel unit during tilting of the load transporter about a wheel axis in the NORMAL-LIFT mode;

FIG. 4B is a side elevation and diagrammatic view of the load transporter from FIG. 4A in the laid-back, unassisted position in which the mode changer remains in the engaged position and the load support pivots only about the wheel axis without the load support moving relative to the wheel unit prior to being lifted fully off the surface during lifting of a relatively lightweight object in the NORMAL-LIFT mode;

FIG. 5A is a side elevation and diagrammatic view of the load transporter in the upright orientation and the mode changer moved to the disengaged position to change the load transporter from the NORMAL-LIFT mode to the LOAD-ASSIST mode, and suggesting that the load support is free to pivot about the load assist axis from the upright orientation to the first-stage, laid-back orientation prior to the load transporter pivoting about the wheel axis, as shown in FIGS. 5B and 5C, to pre-tilt the load support relative to the wheel unit so that a center of gravity of a relatively larger object is shifted rearwardly toward the wheel unit while a rear end of the toe plate remains set on the ground;

FIG. 5B is a side elevation and diagrammatic view of the load transporter in the first-stage, laid-back orientation after the load support has pivoted relative to the wheel unit about the load assist axis and suggesting that further tilting of the load transporter will cause the load transporter to pivot about the wheel axis which is spaced apart from the load assist axis;

FIG. 5C is a side elevation and diagrammatic view of the load transporter in the second-stage, laid-back orientation in which the load transporter has been tilted to pivot about the wheel axis and to lift the rear end of the toe plate off the surface to carry and transport the relatively larger object across the surface in the LOAD-ASSIST mode;

FIG. 6B is an exploded assembly view of the mode changer showing that the axle retainer includes a pair of axle motion blockers each having an axle-griping surface configured to grip the axle in the NORMAL-LIFT mode and a pedal motion-transfer link coupled to the load-assist activation pedal to transfer motion to each of the axle motion blockers and showing that the load-assist release pedal has a link-gripping surface configured to engage the pedal motion-transfer link in the disengaged position to block the axle retainer from returning to the engaged position until receipt of a load-assist release force on the load-assist release pedal;

FIG. 7A is a perspective view showing the mode changer in the engaged position in which movement of the axle through the first and second arcuate slots is blocked during tilting of the load transporter rearwardly from the upright orientation while the load transporter is in the NORMAL-LIFT mode until the load-assist activation pedal receives a load-assist activation force to cause the axle retainer to pivot about the axle retainer pivot axis from the engaged position to the disengaged position;

FIG. 7B is an enlarged portion of FIG. 7A showing a portion of the mode changer in the engaged position;

FIG. 8A is a perspective view showing the axle retainer pivoted about the axle-retainer pivot axis to the disengaged position in which each axle motion blocker is offset from the first and second arcuate slots so that the axle is free to travel from a lower end of the slots to an upper end of the slots about the load-assist axis as the load transporter is pivoted rearwardly from the upright orientation to the first-stage, laid-back orientation;

FIG. 8B is an enlarged portion of FIG. 8A showing a portion of the mode changer in the disengaged position;

FIG. 9A is a perspective view showing the load support pivoted about the load assist axis relative to the wheel unit to the first-stage, load-assist orientation and the axle moved from a lower end of the slots to an upper end of the slots about the load-assist axis;

FIG. 9B is an enlarged portion of FIG. 9A showing the axle arranged at an upper end of one of the slots and the load-assist release pedal engaging the axle retainer to block the mode changer from returning to the engaged position;

FIG. 10 is a perspective view of the load transporter in the second-stage, laid-back orientation in which the rear end of the toe plate is lifted off the ground so that the wheels are free to roll across the surface and transport an object;

FIG. 11A is a perspective view showing the load transporter returned to the upright orientation and the mode changer in the disengaged position;

FIG. 11B is an enlarged view of a portion of FIG. 11A suggesting that application of a load-assist release force on the load-assist release pedal will change the mode changer from the disengaged position to the engaged position;

FIG. 12A is a perspective view showing the mode changer returned to the disengaged position;

FIG. 12B is an enlarged view of a portion of FIG. 12A showing application of the load-assist release force on the load-assist release pedal to return the mode changer to the engaged position;

DETAILED DESCRIPTION

Figure 2:
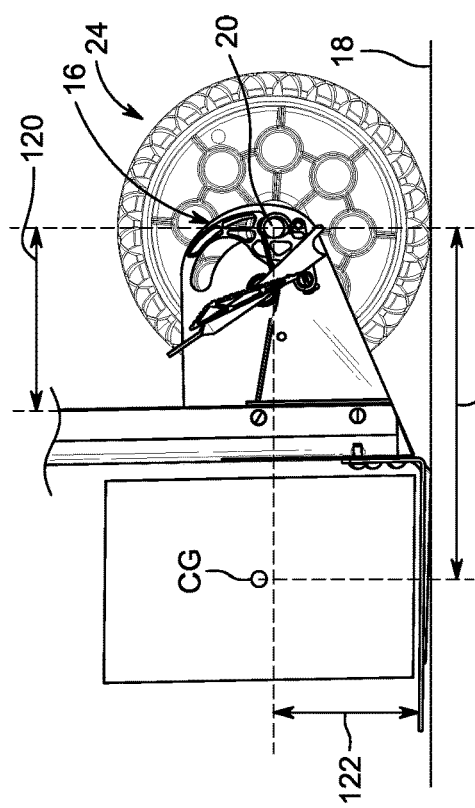
FIGS. 2 and 3 are a series of side elevation views of a portion of the load transporter shown in FIG. 1 suggesting that the mode changer can be pivoted relative to the wheel unit and the load support about an axle-retainer pivot axis between the engaged position, in which the mode changer engages an axle of the wheel unit to block movement of the wheel unit relative to the load support, to the disengaged position, in which the mode changer is moved out of an axle pathway defined by an arcuate slot formed in a portion of the load support so that the axle can travel through the arcuate slot as the load support moves relative to the wheel unit from the upright orientation to the first stage, laid-back orientation as shown in FIG. 3.
Figure 3:
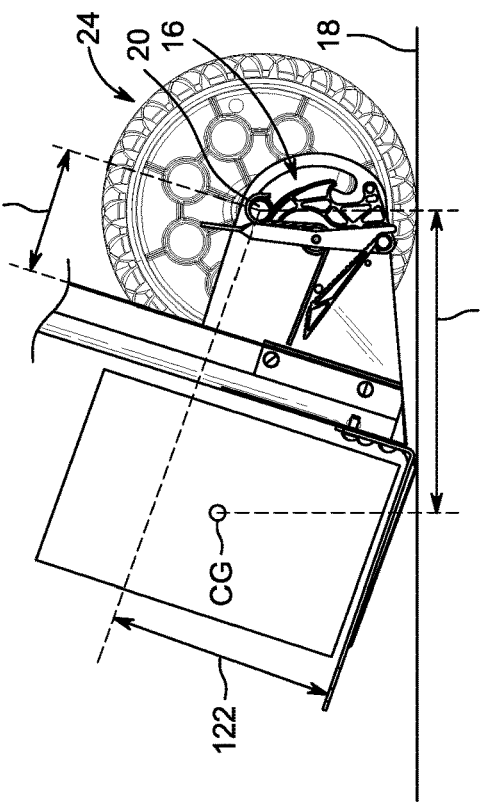
Figure 1:
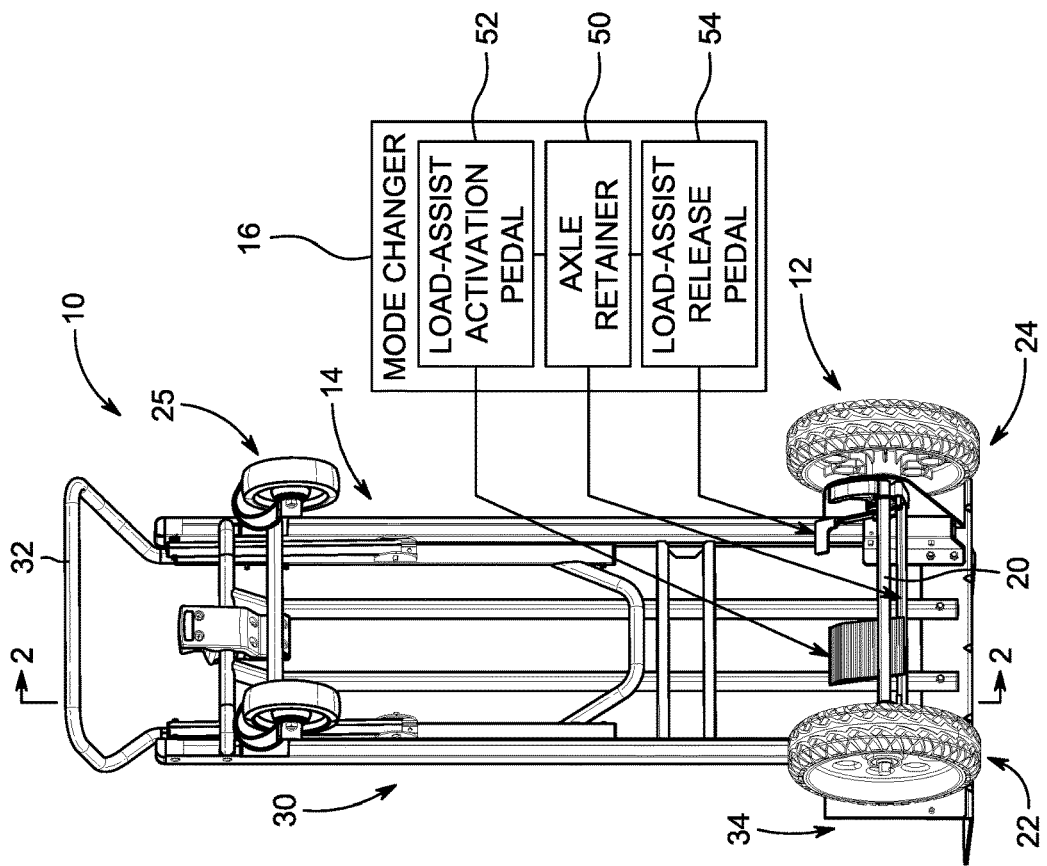
FIG. 1 is a perspective diagrammatic view of a load transporter in accordance with the present disclosure including a wheel unit, a load support coupled to the wheel unit to carry objects while the wheel unit rolls across a surface in either a NORMAL-LIFT mode, as shown in FIGS. 4A and 4B, or a LOAD-ASSIST mode, as shown in FIGS. 5A-5C, and a mode changer that may be moved from an engaged position to a disengaged position to change the load transporter from the NORMAL-LIFT mode to the LOAD-ASSIST mode, the LOAD-ASSIST mode configured to permit the load support to move relative to the wheel unit as the load transporter is tilted from an upright orientation, as shown in FIG. 2, to a first-stage, laid-back orientation, as shown in FIG. 3, to cause a center of gravity of object to shift toward the wheel unit while a portion of the load support remains planted on the surface so that a force required to lift the object during tilting of the load support about a wheel axis from the first-stage, laid back position to a second-stage, laid back position is reduced.
Figure 4A:
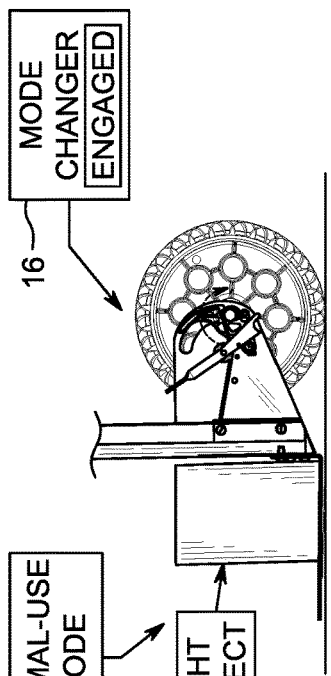
FIGS. 4A and 4B are a series of side elevation and diagrammatic views showing the load transporter in a NORMAL-LIFT mode and includes biasing means for normally urging the axle to a lower end of the arcuate slot and the mode changer to the engaged position so that the load support is blocked normally from moving relative to the wheel unit to the first-stage, laid-back orientation when the load transporter is tilted by an operator to carry and transport an object in the laid-back, unassisted position as suggested in FIG. 4B.
Figure 5A:
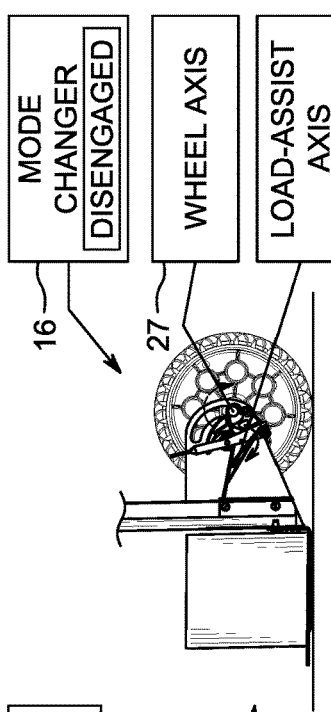
FIGS. 5A-5C are a series of side elevation and diagrammatic views showing the load transporter in the LOAD-ASSIST mode by pivoting the mode changer from the engaged position to the disengaged position so that the load support is free to move relative to the wheel unit as the load support is tilted from the upright orientation to the first-stage, laid-back orientation, as shown in FIG. 5B, and to the second-stage, laid-back orientation, as shown in FIG. 5C, in response to the load transporter being tilted by an operator while lifting and carrying a relatively heavier object by the load support.
Figure 5B:
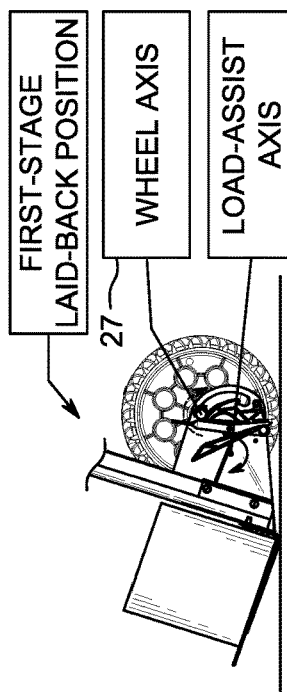
Figure 5C:
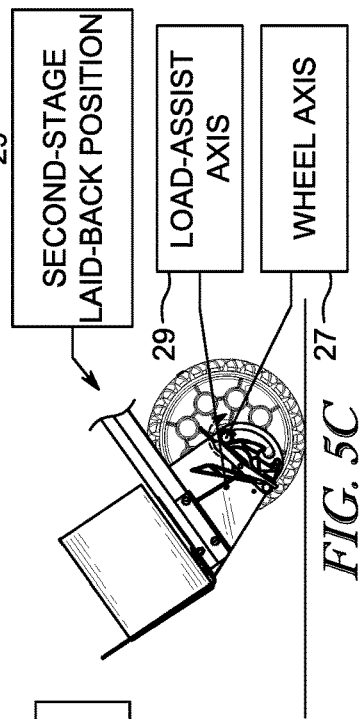
Figure 4B:
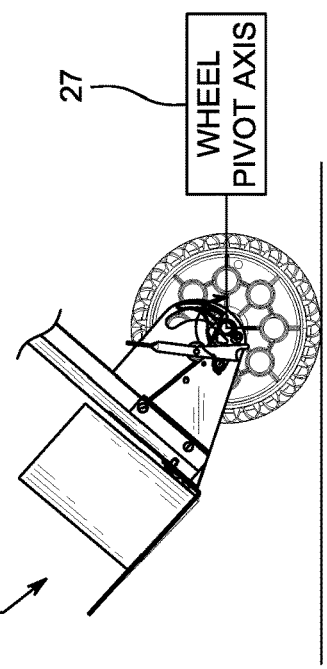

A load transporter 10 in accordance with the present disclosure is shown in FIG. 1 and is configured to change between a NORMAL-LIFT mode as shown in FIGS. 4A and 4B to a LOAD-ASSIST mode as shown in FIG. 5A-5C to help an operator lift and transport objects across a surface 18. The load transporter 10 includes a wheel unit 12, a load support 14 coupled to the wheel unit 12, and a mode changer 16 coupled to the load support 14 as shown in FIG. 1. The wheel unit 12 is configured to support the load support 14 above the surface 18 when the load transporter 10 is moved from an upright orientation as shown in FIGS. 1 and 2 to a first-stage, laid-back orientation as shown in FIGS. 3 and 5B, and then to a second-stage, laid-back orientation as shown in FIG. 5C, when the load transporter is in the LOAD-ASSIST mode. The mode changer 16 is coupled to the load support and may be manipulated by the operator when the load transporter 10 is in the upright orientation to change the load transporter 10 between the NORMAL-LIFT mode and the LOAD-ASSIST mode.

The wheel unit 12 allows the load transporter to roll across the surface 18 and includes an axle 20 and a pair of wheels 22, 24 coupled to opposite ends of the axle 20 as shown in FIGS. 1 and 2. The axle 20 is a cylindrical rod that extends through openings or slots 46, 48 formed in the load support 14 to mount the wheels 22, 24 to the load support 14. The wheels 22, 24 are configured to rotate relative to the load support 14 about a wheel axis 27 provided by the axle 20 to move the load transporter 10 across the surface 18.

Figure 6A:
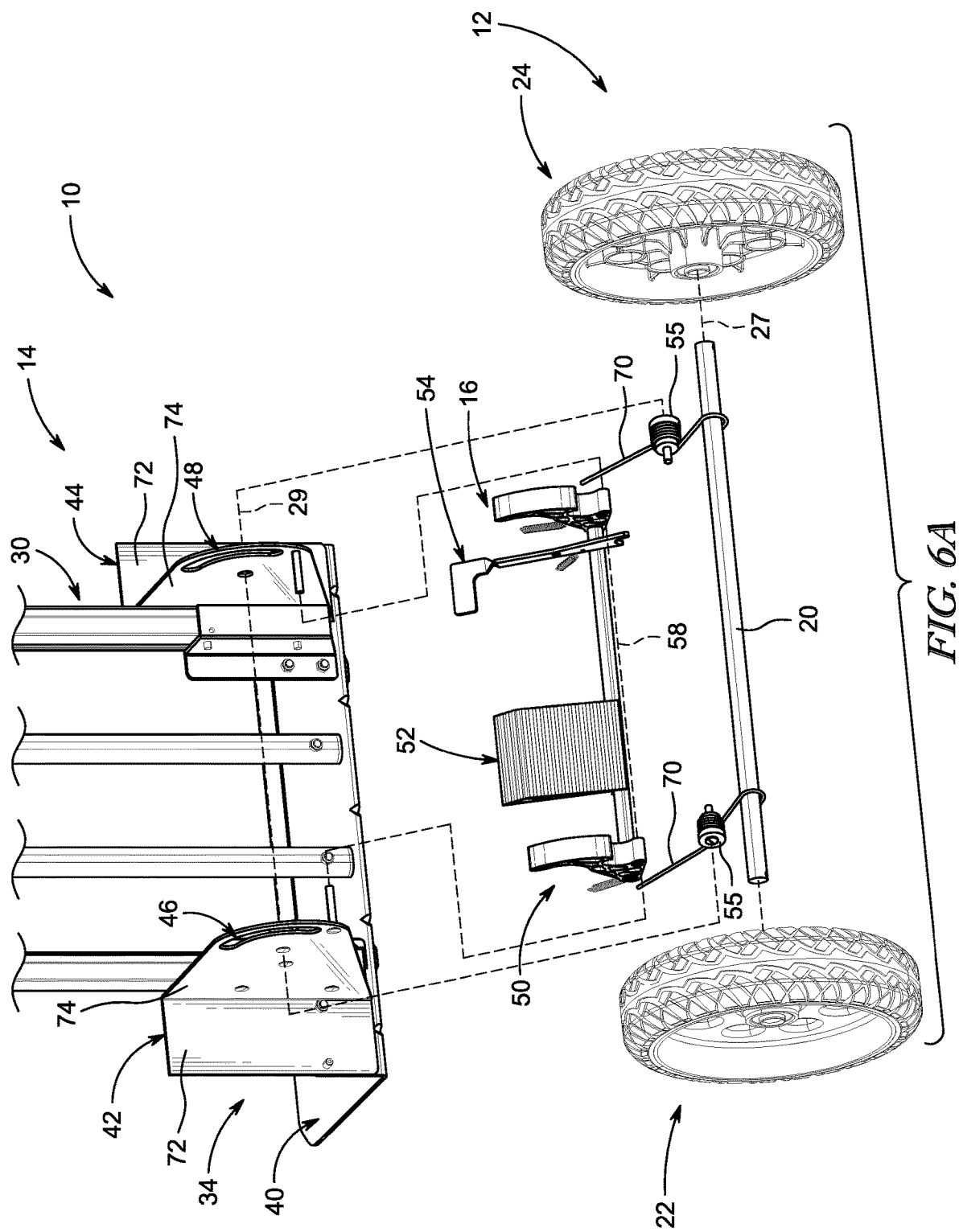
FIG. 6A is an exploded assembly view of a portion of the load transporter shown in FIG. 1 showing that the wheel unit includes a pair of wheels and an axle and showing that the load support includes a support frame, a toe plate for lifting objects, and an axle mount configured to mount the load support to the axle of the wheel unit, the axle mount including a first load-support bracket formed to include a first arcuate slot arranged to receive a first end of the axle and a second load-support bracket formed to include a second arcuate slot arranged to receive a second, opposite end of the axle, and showing that the mode changer includes an axle retainer configured to engage the axle in the engaged position and mounted to the first and second load-support brackets to establish an axle-retainer pivot axis below the axle, a load-assist activation pedal coupled to the axle retainer and configured to be engaged by a user to cause pivoting motion of the axle retainer about the axle-retainer pivot axis, and a load-assist release pedal configured to retain the axle retainer in the disengaged position.

The load support 14 is configured to be grasped and moved by the operator to change the position of the load transporter and includes a support frame 30, a handle 32 coupled to the an upper end of the support frame 30, and a lift unit 34 coupled to a lower end of the support frame 30 as shown in FIG. 6A. The support frame 30 extends between an interconnects the handle 32 and the lift unit 34. The handle 32 is coupled to an upper end of the support frame 30, however, the handle 32 may be omitted in some embodiments. The lift unit 34 is coupled to a lower end of the support frame 30 and is coupled to the wheel unit 12 to support the load support 14 on the wheel unit 12. The load support 14 may further include caster wheels 25 located near the handle 32 so that the load transporter 10 can be laid all the way down on wheels 22, 24, and 25 and used as a cart in a cart mode. The mode changer 16 blocks the wheels unit 12 from moving relative to the load support 14 when the load transporter 10 is in the cart mode.

The lift unit 34 is configured to lift and support objects and includes a toe plate 40 and first and second load-support brackets 42, 44 as shown in FIGS. 1-4. The toe plate 40 is configured to slide under objects and lift the objects when the load transporter 10 is moved from the upright orientation to the laid-back orientation. Each of the first and second load-support brackets 42, 44 are coupled to opposite left and right lateral sides of the toe plate 40 and corresponding lateral sides of the support frame 30. Each of first and second load-support brackets 42, 44 are also coupled to the axle 20 of the wheel unit 12.

The load support 14 is movable relative to the wheel unit 12 when the mode changer 16 is in a disengaged position relative to the wheel unit 12. Each of the first and second load-support brackets 42, 44 is formed to include an arcuate guide slot 46, 48 that receives a corresponding end of the axle 20. The axle 20 travels through the guide slots 46, 48 to adjust the location of the toe plate 40 relative to the wheel unit 12, thereby lightening the load on the load support 14 when the operator is handling the load transporter 10 in the LOAD-ASSIST mode. The load support 14 is configured to rotate about a load-assist axis 29 as the axle 20 travels through the guide slots 46, 48. The load-assist axis 29 is spaced apart from the wheel axis 27. Illustratively, the guide slots 46, 48 are curved such that they are concave relative to the toe plate 40 and convex relative to an operator standing behind the load transporter 10. Each of the guide slots 46, 48 also has a radius of curvature with a center at the load-assist axis 29, however, the load-assist axis 29 may be offset from the center of the radius of curvature in other embodiments.

The mode changer 16 is mounted to the first and second load-support brackets 42, 44 for pivotable movement relative to the load-support brackets 42, 44. The mode changer 16 includes an axle retainer 50, a load-assist activation pedal 52, and a load-assist release pedal 54. The axle retainer 50 extends between the load-support brackets 42, 44 to position the load-assist activation pedal 52 and is configured to engage the axle 20 in the engaged position to block movement of the axle 20 through the guide slots 46, 48. The load-assist activation pedal 52 is coupled to the axle retainer 50 for movement therewith and may be operated by a user to change the axle retainer 50 from the engaged position to the disengaged position. The load-assist release pedal 54 is mounted to the load support 14 and is configured to engage the axle retainer 50 in the disengaged position to retain the load transporter in the LOAD-ASSIST mode until the user desires to return the load transporter back to NORMAL-LIFT mode.

A first distance 120 is established between a load-support reference plane aligned with an underside of the support frame 30 and a spaced-apart first wheel-axle reference plane aligned with the axle 20 and arranged parallel with the load-support reference plane as shown in FIGS. 2 and 3. A second distance 122 is defined between a toe-plate shelf reference plane that is aligned with an upper surface of the toe plate 40 and a spaced-apart second wheel-axle reference plane that is aligned with the axle 20 and arranged parallel with the toe-plate shelf reference axis. Movement of the load support relative to the wheel unit to the first-stage laid-back orientation causes the first distance 120 to decrease and the second distance 122 to increase so that a center of gravity CG of the object shifts rearwardly toward the wheel unit 12. A third distance 124 defined between the center of gravity CG and the axle 20 also decrease as the load support 14 shifts relative to the wheel unit 12. A rear end of the toe plate remains set on the surface 18 underlying the load transporter 10 thereby facilitating lifting of the rear end of the toe plate 40 and the object completely off the ground.

The axle retainer 50 includes a first axle-motion blocker 56, a second axle-motion blocker 57 and a pedal motion-transfer link 59 interconnecting the first and second axle-motion blockers 56, 57 as shown in FIG. 6B. The first and second motion blockers 56, 57 are configured to grip the axle 20 at a lower end 60 of each guide slot 46, 48 to block the axle 20 from traveling through the guide slots 46, 48 as the load transporter 10 is tilted rearwardly when the mode changer 16 is in the engaged position. The load-assist activation pedal 52 is coupled to the pedal motion-transfer link 59 so that movement of the load-assist activation pedal 52 is transferred to the first and second axle-motion blockers 56, 57. In some embodiments, only one axle-motion blocker 56, 57 may be included in the load transporter 10.

Together, the load-assist activation pedal 52 and the axle retainer 50 are configured to rotate about an axle-retainer pivot axis 58 between the engaged position and the disengaged position. The axle retainer 50 and the load-assist activation pedal 52 are biased to the engaged position by a pair of biasing elements 80 interconnecting the axle retainer 50 and the load-support brackets 42, 44. Biasing elements 80 are tension springs in the illustrative embodiment, however other types of springs or elastic members may be used. The tension springs 80 may be coupled to other portions of the load support 14.

When the mode changer 16 is in the engaged position, the load transporter 10 may be operated in the NORMAL LIFT mode as shown in FIGS. 4A and 4B. With the mode changer 16 in the engaged position and the load transporter 10 in the upright orientation as shown in FIGS. 7A-8B, an operator can exert an initial, pushing force on the axle 20 to wedge the toe plate 40 under an object. The load transporter 10 can then be tilted to a laid-back, unassisted position as shown in FIG. 4B with the mode changer still in the engaged position so that the load support 14 does not move relative to the wheel unit 12. In this instance, the load transporter 10 may be kept in the NORMAL LIFT mode to expedite lifting and maneuvering an object across surface 18 and to provide more stabilization for relatively light objects. In the NORMAL-LIFT mode, axle-gripping surfaces 90, 92 of the first and second axle-motion blockers 56, 57 are aligned with the axle 20 and a pathway of the axle 20 through guide slots 46, 48. The axle 20 is blocked from traveling through the guide slots 46, 48 by the axle-gripping surfaces 90, 92 in the engaged position. The axle-gripping surfaces 90, 92 at least partially define c-shaped channels formed into each respective axle-motion blocker 56, 57 and that receive the axle 20 in the engaged position.

The load transporter 10 may be changed to the LOAD-ASSIST mode when a relatively heavier object is being lifted and transported, for example, as shown in FIGS. 5A-5C. The mode changer 16 may initially be kept in the engaged position as shown in FIG. 7A and the operator can exert the initial, pushing force on the axle 20 to wedge the toe plate 40 under the relatively heavier object. Once the toe plate 40 is under the object, the operator may apply a load-assist activation force 100 on the load-assist activation pedal 52 to pivot the axle retainer 50 about the axle-retainer pivot axis 58 to the disengaged position. The load-assist release pedal 54 is coupled to the second load-support bracket 44 and is configured to pivot relative to the load support 14 about a release pedal pivot axis 64 between a locked position and an unlocked position. In the locked position, the load-assist release pedal 54 engages the axle retainer 50 to block the axle retainer 50 from moving from the disengaged position to the engaged position. The load-assist release pedal 54 is biased toward the locked position by a biasing element 82 to automatically engage the axle retainer 50 once the axle retainer 50 reaches the disengaged position as shown in FIG. 8B. Biasing element 82 is a tension spring in the illustrative embodiment, however another type of spring or elastic member may be used. The biasing element 82 is coupled to load-support bracket 44, however, biasing element 82 may be coupled to other portions of the load support 14.

With the mode changer 16 in the disengaged position, the load transporter 10 may be tilted from the upright orientation to a first-stage, load-assist position to shift a center of gravity of an object toward the wheel unit 12 in a first stage pivot motion as shown in FIGS. 9A and 9B. In the first stage pivot motion, the load support 14 moves relative to the wheel unit 12 about a load-assist axis and the axle 20 travels from a lower end 60 of the guide slots 46, 48 to an upper end 62 of the guide slots 46, 48. At the same time, a rear end of the toe plate 40 and/or a lower end of the support frame 30 remains planted on the surface 18 during the first stage pivot motion while a forward end of the toe plate is lifted off the surface 18 a distance 104. A center of gravity CG of the object is shifted rearward toward the wheel unit 12 during the first stage pivot motion such that a greater amount of the weight of the object is supported by the wheel unit 12 after the first stage pivot motion in the LOAD-ASSIST mode compared to a weight of the object in the NORMAL LIFT mode.

The load transporter 10 may also be tilted from the first-stage, load-assist position to a second-stage load-assist position to lift the object away from the surface 18 in a second stage pivot motion as shown in FIGS. 5C and 10. In the second stage pivot motion, the load transporter 10 is tilted further rearward about the wheel axis 27 so that the rear end of the toe plate 40 is lifted off of the surface 18 and only the wheels 22, 24 contact the surface 18. Because the center of gravity CG was shifted to a position closer to the wheel unit 12 during the first stage pivot motion, the object is easier to lift and maneuver during the second stage pivot motion using the load transporter 10. Thus, a relatively lower tilting force is required to lift the toe plate 40 from the surface 18 when the load transporter 10 is in the LOAD-ASSIST mode compared to a tilting force required to lift the toe plate 40 from the surface 18 when the load transporter 10 is in the NORMAL LIFT mode.

The wheel unit 12 may further include one or more biasing elements 70 that are configured to bias the axle 20 toward the lower end 60 of the guide slots 46, 48 as shown in FIGS. 6A and 6B. The biasing elements 70 are illustratively embodied as torsion springs that are wrapped around bosses 55 which are fixed to the first and second load-support brackets 42, 44 and the axle 20. The torsion springs 70 include ends that apply a downward force from the left and right load-support brackets 42, 44 to the axle 20 to cause the axle 20 to rotate about the load-assist axis 29 until the axle 20 reaches the lower end 60 of the guide slots 46, 48. Bosses 55 also act as stoppers to engage a portion of the first and second axle-motion blockers 56, 57 when load-assist activation pedal 52 is pressed and block further rotation of the axle retainer 50 about the axle-retainer pivot axis 58. In other embodiments, the biasing elements 70 may be omitted and the axle may return to the lower ends 60 of the guide slots 46, 48 by gravity when the load transporter 10 is returned to the upright position.

The axle retainer 50 is retained in the disengaged position by an axle-retainer gripping surface 94 at a lower end of the load-assist release pedal 54 as shown in FIGS. 11A-11B. The operator may apply a load-assist release force 102 on the release pedal 54 to separate the axle-retainer gripping surface 94 from the axle retainer 50. The load-assist release force 102 is applied at an upper end of the release pedal 54 opposite the gripping surface 94 to cause the release pedal 54 to rotate about the release pedal pivot axis 64 and against biasing element 82. The biasing elements 80 then apply a tensile force on a lower end of the axle retainer 50 to cause the axle retainer 50 to return automatically to the engaged position when the load transporter 10 is in the upright orientation as shown in FIGS. 12A and 12B.

The axle retainer 50 further includes one or more return motion-blocking surfaces 96, 98 that are configured to block the axle retainer 50 from returning to the engaged position until the load transporter reaches the upright orientation as shown in FIGS. 11A-12B. The return motion-blocking surfaces 96, 98 are formed on extensions of the first and second axle-motion blockers 56, 57 above axle gripping surfaces 90, 92. The return motion blocking surfaces 96, 98 are configured to engage the axle 20 to block the axle retainer 50 from returning to the engaged position when the load transporter 10 is in any orientation other than the upright orientation. For example, if the release pedal 54 is actuated prior to the load transporter 10 returning to the upright orientation and the axle 20 returning to the lower end of guide slots 46, 48, the return motion-blocking surfaces 96, 98 engage the axle 20 to block full return to the engaged position. The return motion-blocking surfaces 96, 98 have a curved profile that generally tracks the curvature of the guide slots 46, 48 to provide a smooth transition back to the engaged position.

The left and right load-support brackets 42, 44 each include a toe-support plate 72 and a wheel-support plate 74 as shown in FIG. 6A. Each toe-support plate 72 is coupled to the toe plate 40. Each wheel-support plate 74 extends rearward away from the toe plate 40 and the toe-support plate 72 and is arranged generally perpendicular to each toe-support plate 72. The guide slots 46, 48 are each formed into respective wheel-support plates 74.

Figure 13:
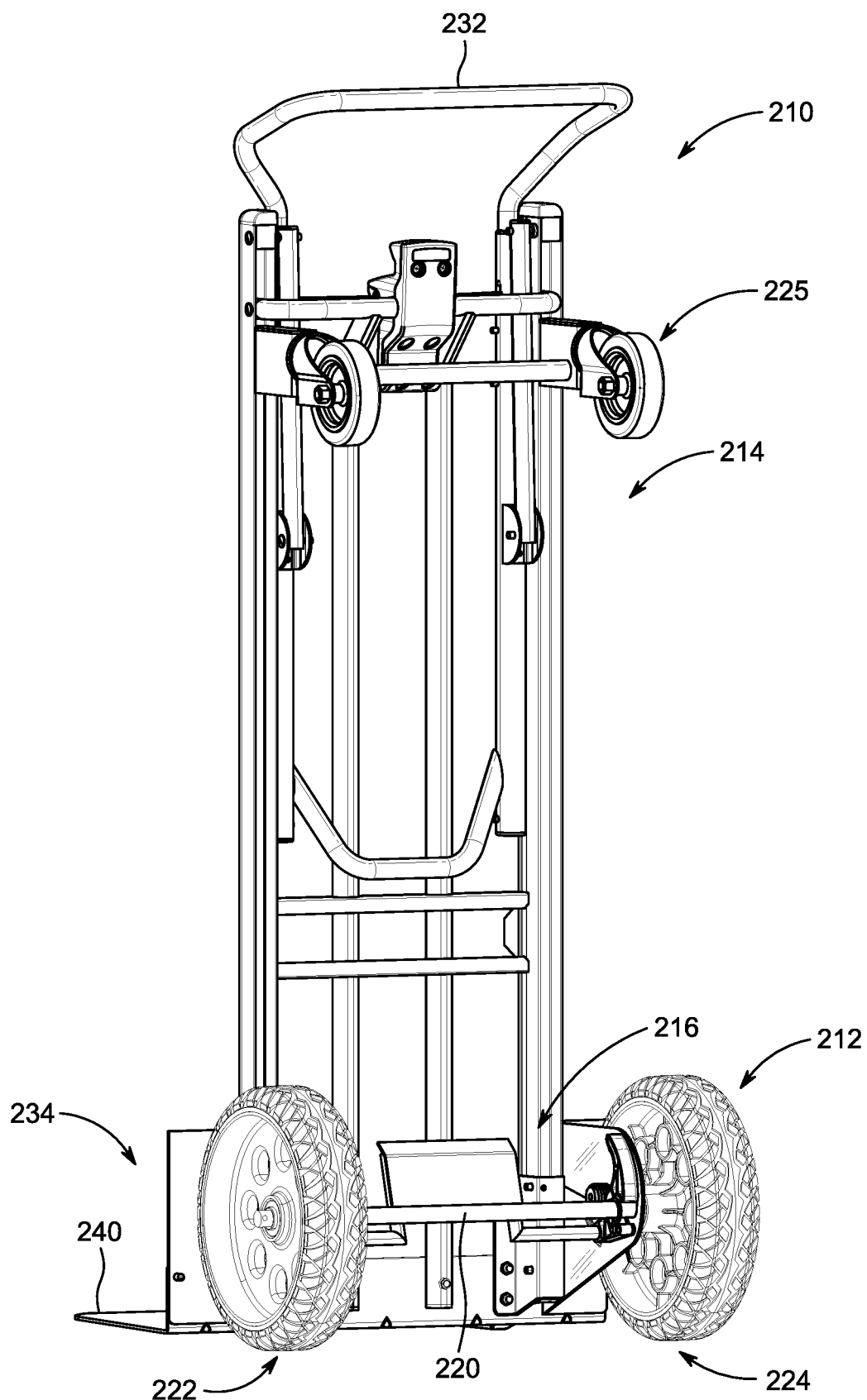
FIG. 13 is a perspective view of a second embodiment of a load transporter in accordance with the present disclosure including similar features to the load transporter shown in FIGS. 1-12B.
Figure 14:
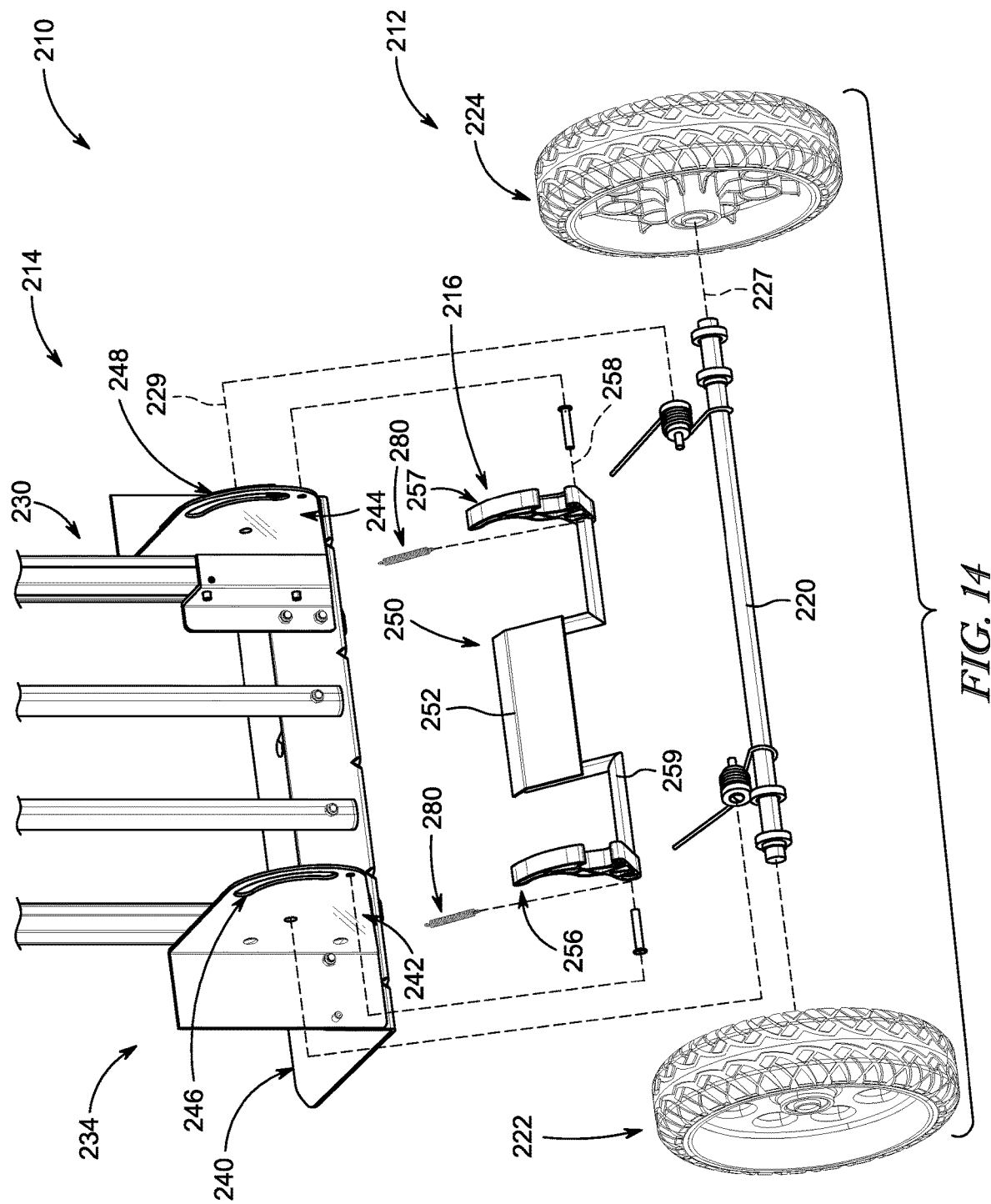
FIG. 14 is an exploded assembly view of the second embodiment of the load transporter from FIG. 13.

A second embodiment of a load transporter 210 is shown in FIGS. 13 and 14. The load transporter 210 is substantially similar to load transporter 10 shown in FIGS. 1-12B. Accordingly, similar reference numbers in the 200 series are used to reference similar features between load transporter 210 and load transporter 10. The disclosure of load transporter 10 is incorporated by reference for load transporter 210.

The load transporter 210 is configured to change between a NORMAL-LIFT mode to a LOAD-ASSIST mode to help an operator lift and transport objects across a surface 18. The load transporter 210 includes a wheel unit 212, a load support 214 coupled to the wheel unit 212, and a mode changer 216 coupled to the load support 214 as shown in FIG. 13. The wheel unit 212 is configured to support the load support 214 above the surface 18 when the load transporter 210 is moved from an upright orientation to a first-stage, laid-back orientation and then to a second-stage, laid-back orientation when the load transporter is in the LOAD-ASSIST mode. The mode changer 216 is coupled to the load support and may be manipulated by the operator when the load transporter 210 is in the upright orientation to change the load transporter 210 between the NORMAL-LIFT mode and the LOAD-ASSIST mode.

The wheel unit 212 allows the load transporter to roll across the surface 18 and includes an axle 220 and a pair of wheels 222, 224 coupled to opposite ends of the axle 220 as shown in FIG. 13. The axle 220 is a cylindrical rod that extends through openings or slots 246, 248 formed in the load support 214 to mount the wheels 222, 224 to the load support 214. The wheels 222, 224 are configured to rotate relative to the load support 214 about a wheel axis 227 provided by the axle 220 to move the load transporter 210 across the surface 18.

The load support 214 is configured to be grasped and moved by the operator to change the position of the load transporter 210 and includes a support frame 230, a handle 232 coupled to the an upper end of the support frame 230, and a lift unit 234 coupled to a lower end of the support frame 230. The support frame 230 extends between an interconnects the handle 232 and the lift unit 234. The handle 232 is coupled to an upper end of the support frame 230, however, the handle 232 may be omitted in some embodiments. The lift unit 234 is coupled to a lower end of the support frame 230 and is coupled to the wheel unit 212 to support the load support 214 on the wheel unit 212. The load support 214 may further include caster wheels 225 located near the handle 232 so that the load transporter 210 can be laid all the way down on wheels 222, 224, and 225 and used as a cart in a cart mode. The mode changer 216 blocks the wheels unit 212 from moving relative to the load support 214 when the load transporter 210 is in the cart mode.

The lift unit 234 is configured to lift and support objects and includes a toe plate 240 and first and second load-support brackets 242, 244. The toe plate 240 is configured to slide under objects and lift the objects when the load transporter 210 is moved from the upright orientation to the laid-back orientation. Each of the first and second load-support brackets 242, 244 are coupled to opposite left and right lateral sides of the toe plate 240 and corresponding lateral sides of the support frame 230. Each of first and second load-support brackets 242, 244 are also coupled to the axle 220 of the wheel unit 212.

The load support 214 is movable relative to the wheel unit 212 when the mode changer 216 is in a disengaged position relative to the wheel unit 212. Each of the first and second load-support brackets 242, 244 is formed to include an arcuate guide slot 246, 248 that receives a corresponding end of the axle 220. The axle 220 travels through the guide slots 246, 248 to adjust the location of the toe plate 240 relative to the wheel unit 212, thereby lightening the load on the load support 212 when the operator is handling the load transporter 210 in the LOAD-ASSIST mode. The load support 214 is configured to rotate about a load-assist axis 229 as the axle 220 travels through the guide slots 246, 248. The load-assist axis 229 is spaced apart from the wheel axis 227.

The mode changer 216 is mounted to the first and second load-support brackets 242, 244 for pivotable movement relative to the load-support brackets 242, 244. The mode changer 216 includes an axle retainer 250 and a load-assist activation pedal 252. The axle retainer 250 extends between the load-support brackets 242, 244 to position the load-assist activation pedal 252 and is configured to engage the axle 220 in the engaged position to block movement of the axle 220 through the guide slots 246, 248. The load-assist activation pedal 252 is coupled to the axle retainer 250 for movement therewith and may be operated by a user to change the axle retainer 250 from the engaged position to the disengaged position. The mode changer 216 does not include a release pedal and the axle retainer is biased to return automatically to the engaged position when the load transporter 210 returns to the upright orientation.

The axle retainer 250 includes a first axle-motion blocker 256, a second axle-motion blocker 257, and a pedal motion-transfer link 259 interconnecting the first and second axle-motion blockers 256, 257. The first and second motion blockers 256, 257 are configured to grip the axle 220 at a lower end of each guide slot 246, 248 to block the axle 220 from traveling through the guide slots 246, 248 as the load transporter 210 is tilted rearwardly when the mode changer 216 is in the engaged position. The load-assist activation pedal 252 is coupled to the pedal motion-transfer link 259 so that movement of the load-assist activation pedal 252 is transferred to the first and second axle-motion blockers 256, 257. In some embodiments, only one axle-motion blocker 256, 257 may be included in the load transporter 210.

Together, the load-assist activation pedal 252 and the axle retainer 250 are configured to rotate about an axle-retainer pivot axis 258 between the engaged position and the disengaged position. The axle retainer 250 and the load-assist activation pedal 252 are biased to the engaged position by a pair of biasing elements 280 interconnecting the axle retainer 250 and the load-support brackets 242, 244. Biasing elements 280 are tension springs in the illustrative embodiment, however other types of springs or elastic members may be used. The biasing elements 280 may be coupled to other portions of the load support 214.

Figure 15:
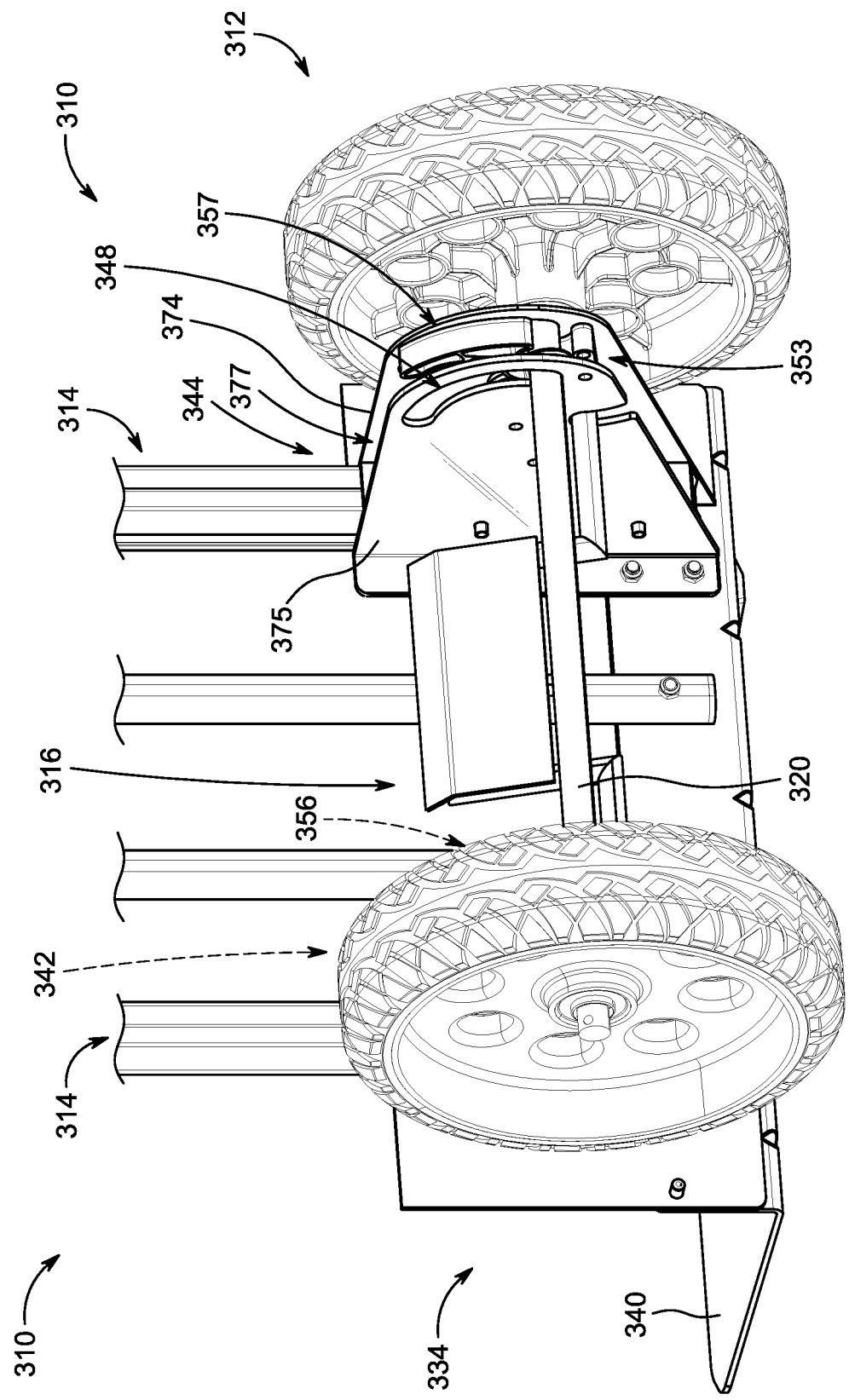
FIG. 15 is a perspective view of a third embodiment of a load transporter in accordance with the present disclosure, and further showing that the load transporter includes a first and a second inner load-support bracket corresponding to the first and second load-support bracket of the load support to separate the load-assist activation pedal from the first and second axle retainers and to support both ends of fasteners coupling the biasing means and the mode changer to the load support thereby increasing the rigidity and durability of the fasteners.

A third embodiment of a load transporter 310 is shown in FIG. 15. The load transporter 310 is substantially similar to load transporter 10 shown in FIGS. 1-12B and load transporter 210. Accordingly, similar reference numbers in the 300 series are used to reference similar features between load transporter 310 and load transporters 10, 210. The disclosure of load transporters 10, 210 is incorporated by reference for load transporter 310.

The load transporter 310 is configured to change between a NORMAL-LIFT mode to a LOAD-ASSIST mode to help an operator lift and transport objects across a surface 18. The load transporter 310 includes a wheel unit 312, a load support 314 coupled to the wheel unit 312, and a mode changer 316 coupled to the load support 314 as shown in FIG. 15. The wheel unit 312 allows the load transporter to roll across the surface 18 and includes an axle 320 and a pair of wheels 322, 324 coupled to opposite ends of the axle 320 as shown in FIG. 15. The axle 320 is a cylindrical rod that extends through openings or slots 348 formed in the load support 314 to mount the wheels 322, 324 to the load support 314.

The load support 314 includes a support frame 330, a handle coupled to the an upper end of the support frame 330, and a lift unit 334 coupled to a lower end of the support frame 330. The lift unit 234 is configured to lift and support objects and includes a toe plate 340 and first and second load-support brackets 342, 344. The left and right load-support brackets 342, 344 each include an outer wheel-support plate 374 and an inner wheel-support plate 375 spaced apart from one another to provide a retainer channel 377 therebetween as shown in FIG. 15. motion blockers 356, 357 reside in a corresponding retainer channel 377 to reduce user contact with the motion blockers 356, 357. Rivets or fasteners supporting the mode changer 16 and biasing means are supported on both ends by each corresponding support plate 374, 375 as opposed to being cantilevered with only one support plate 74 as shown in FIGS. 1-12B. Features of load transporters 10, 210, 310 may be combined with one another.

The invention claimed is:

1. A load transporter comprising
a wheel unit including a first wheel, a second wheel, and an axle extending between and interconnecting the first and second wheels,
a load support including a support frame, a handle coupled to an upper end of the support frame, and a toe plate coupled to a lower end of the support frame, the load support is mounted to the wheel unit for pivotable motion relative to the wheel unit about a load-assist axis from an upright orientation, in which the toe plate is arranged generally parallel with a surface underlying the wheel unit and the load support, to a first-stage, laid back orientation, in which a front end of the toe plate is lifted away from the surface while a rear end of the toe plate remains planted on the surface, and for pivotable motion about a wheel axis defined by the axle and spaced apart from the load-assist axis from the first-stage, laid-back orientation to a second-stage, laid-back orientation, in a load-assist mode, and
a mode changer configured to selectively block movement of the load support relative to the wheel unit from the upright orientation to the first-stage, laid back orientation so that the load support pivots only about the wheel axis during tilting of the load support from the upright orientation to a laid-back, unassisted orientation, in which the toe plate is lifted away from the surface so that the wheels can roll across the surface in a normal-lift mode, the mode changer including an axle retainer coupled to the support frame, a load-assist activation pedal coupled to the axle retainer, and a load-assist release pedal coupled to the load support, the load-assist activation pedal engagable selectively by a user to pivot the axle retainer about an axle-retainer pivot axis from an engaged position, in which the axle retainer engages the axle of the wheel unit and blocks movement of the load support relative to the wheel unit from the upright orientation to the first-stage, laid back orientation, to a disengaged position, in which the axle retainer allows movement of the load support relative to the wheel unit from the upright orientation to the first-stage, laid back orientation, the load-assist release pedal coupled to the load support for pivotable movement relative to the load support between a released position, in which the axle retainer is free to move from the engaged position to the disengaged position, and a locked position, in which the load-assist release pedal engages the axle retainer and blocks the axle retainer from moving from the disengaged position to the engaged position.

2. The load transporter of claim 1, wherein the axle retainer is biased toward the engaged position and the load-assist release pedal is biased toward the locked position.

3. The load transporter of claim 1, wherein the axle retainer includes a first axle motion-blocker and a pedal motion-transfer link coupled to the first axle motion-blocker and the load-assist activation pedal to cause pivoting motion of the first motion-blocker and the pedal motion-transfer link about the axle-retainer pivot axis upon receipt of a load-assist activation force on the load-assist activation pedal to move the axle retainer from the engaged position to the disengaged position.

4. The load transporter of claim 3, wherein the axle retainer further includes a second axle motion-blocker, the first axle motion-blocker is coupled to a first end of the pedal motion-transfer link and the second axle motion blocker is coupled to an opposite, second end of the pedal motion-transfer link.

5. The load transporter of claim 1, wherein the support frame includes a frame foundation coupled to the toe plate and the handle, a first load-support bracket coupled to at least one of the toe plate and the frame foundation and formed to include a first arcuate guide slot, and a second load-support bracket coupled to at least one of the toe plate and the frame foundation and formed to include a second arcuate guide slot, and wherein the axle is received in the first and second arcuate guide slots and is configured to travel through the first and second arcuate guide slots as the load transporter moves from the upright orientation to the first-stage, laid-back orientation in the load-assist mode.

6. The load transporter of claim 5, wherein the axle retainer has an axle-gripping surface, the axle retainer coupled to the load support for pivotable movement about the axle-retainer pivot axis between the engaged position in which the axle-gripping surface is aligned with at least one of the first and second guide slots to block the axle from moving though the first and second arcuate guide slots, and the disengaged position, in which the axle-gripping surface is offset from at least one of the first and second guide slots so that the axle is free to move through the first and second arcuate guide slots.

7. The load transporter of claim 6, wherein the load-assist activation pedal is coupled to the axle retainer for movement between the engaged position and the disengaged position with the axle retainer and the load-assist release pedal coupled to the load support and configured to block selectively movement of the axle retainer from the disengaged position to the engaged position.

8. The load transporter of claim 7, wherein the load-assist release pedal includes a support arm coupled to one of the first and second load-support brackets, a footpad coupled to a first end of the support arm, and an axle-retainer motion blocker coupled to an opposite, second end of the support arm and having a retainer-gripping surface configured to engage the axle retainer in the disengaged position.

9. The load transporter of claim 1, wherein the axle retainer is configured to block the load transporter from changing from the normal-use mode to the load-assist mode, the load-assist activation pedal coupled to the axle retainer and configured to change the load transporter from the normal-use mode to the load-assist mode upon receipt of a load-assist activation force, and the load-assist release pedal coupled to the load support and configured to block the load transporter from moving from the load-assist mode to the normal-use mode until receipt of a load-assist release force.

10. A load transporter comprising
a wheel unit including a first wheel, a second wheel, and an axle extending between and interconnecting the first and second wheels, and
a load support including a support frame, a handle coupled to an upper end of the support frame, and a toe plate coupled to a lower end of the support frame, the load support is mounted to the wheel unit for pivotable motion relative to the wheel unit about a load-assist axis from an upright orientation, in which the toe plate is arranged generally parallel with a surface underlying the wheel unit and the load support, to a first-stage, laid back orientation, in which a front end of the toe plate is lifted away from the surface while a rear end of the toe plate remains planted on the surface, and for pivotable motion about a wheel axis defined by the axle and spaced apart from the load-assist axis from the first-stage, laid-back orientation to a second-stage, laid-back orientation, in a load-assist mode, and
a mode changer configured to selectively block movement of the load support relative to the wheel unit from the upright orientation to the first-stage, laid back orientation so that the load support pivots only about the wheel axis during tilting of the load support from the upright orientation to a laid-back, unassisted orientation, in which the toe plate is lifted away from the surface so that the wheels can roll across the surface in a normal-lift mode,
wherein the support frame includes a frame foundation coupled to the toe plate and the handle, a first load-support bracket coupled to at least one of the toe plate and the frame foundation and formed to include a first arcuate guide slot, and a second load-support bracket coupled to at least one of the toe plate and the frame foundation and formed to include a second arcuate guide slot, and wherein the axle is received in the first and second arcuate guide slots and is configured to travel through the first and second arcuate guide slots as the load transporter pivots about the load-assist axis from the upright orientation to the first-stage, laid-back orientation, and
wherein the mode changer includes an axle retainer coupled to the support frame and an axle-gripping surface, and a load-assist activation pedal coupled to the axle retainer, the axle retainer coupled to the load support for pivotable movement about an axle-retainer pivot axis between an engaged position in which the axle-gripping surface is aligned with at least one of the first and second guide slots to block the axle from moving though the first and second arcuate guide slots, and a disengaged position, in which the axle-gripping surface is offset from at least one of the first and second guide slots so that the axle is free to move through the first and second arcuate guide slots, the load-assist activation pedal coupled to the axle retainer for movement between the engaged position and the disengaged position with the axle retainer and a load-assist release pedal coupled to the load support and configured to block movement of the axle retainer from the disengaged position to the engaged position.

11. The load transporter of claim 10, wherein the first and second guide slots have a radius of curvature with a center at the load-assist axis.

12. A load transporter comprising
a load carrier including: (i) a wheel unit including a first wheel, a second wheel, and an axle extending between and interconnecting the first and second wheels, and (ii) a load support including a support frame and a toe plate coupled to a lower end of the support frame,
means for shifting the load support relative to the wheel axle of the wheel unit to cause a first distance defined between a load-support reference plane aligned with an underside of the support frame and a spaced-apart first wheel-axle reference plane aligned with the axle and arranged parallel with the load-support reference plane to decrease, and to simultaneously cause a second distance defined between a toe-plate shelf reference axis that is aligned with an upper surface of the toe plate and a spaced-apart second wheel-axle reference plane that is aligned with the axle and arranged parallel with the toe-plate shelf reference axis to increase during a first-stage pivot motion of the load support from an upright orientation to a first-stage, laid-back orientation, in which a front end of the toe plate is lifted away from a surface underlying the load carrier while a rear end of the toe plate remains planted on the surface after placement of a load to be transported on the upper surface of the toe plate so that a center of gravity of the load to be transported shifts from an initial position relative to the wheel axis of the axle to a different, shifted position closer to the wheel axis to reduce a force required to lift the object using the toe plate from the first-stage, laid-back configuration to a second-stage, laid back configuration in which the rear end of the toe plate is lifted away from the surface so that the wheels can roll across the surface, and a mode changer configured to selectively block movement of the load support relative to the wheel unit from the upright orientation to the first-stage, laid back orientation so that the load support pivots only about the wheel axis during tilting of the load support from the upright orientation to a laid-back, unassisted orientation, in which the toe plate is lifted away from the surface so that the wheels can roll across the surface in a normal-lift mode, the mode changer including an axle retainer coupled to the support frame and a load-assist release pedal coupled to the load support, the axle retainer configured to block the load transporter from changing from the normal-use mode to a load-assist mode, a load-assist activation pedal coupled to the axle retainer and configured to change the load transporter from the normal-use mode to the load-assist mode upon receipt of a load-assist activation force, the load-assist release pedal configured to block the load transporter from moving from the load-assist mode to the normal-use mode until receipt of a load-assist release force.

13. The load transporter of claim 12, wherein the means for shifting includes a first load-support bracket formed to include a first arcuate guide slot, and a second load-support bracket formed to include a second arcuate guide slot, and wherein the axle is received in the first and second arcuate guide slots and is configured to travel through the first and second arcuate guide slots as the load transporter pivots about a load-assist axis from the upright orientation to the first-stage, laid-back orientation.

14. The load transporter of claim 13, wherein the means for shifting further includes a first spring coupled to the first load-support bracket and the axle and a second spring coupled to the second load-support bracket and the axle, and wherein the first spring and the second spring are configured to bias the axle toward a lower end of the first and second arcuate guide slots so that the load transporter is biased to the normal-lift mode.

15. A load transporter comprising
a wheel unit including a first wheel, a second wheel, and an axle extending between and interconnecting the first and second wheels,
a load support including a support frame, a handle coupled to an upper end of the support frame, a toe plate coupled to a lower end of the support frame, a frame foundation coupled to the toe plate and the handle, and a first load-support bracket coupled to at least one of the toe plate and the frame foundation and formed to include a first arcuate guide slot, the axle received in the first arcuate guide slot, the load support is mounted to the wheel unit for pivotable motion relative to the wheel unit about a load-assist axis from an upright orientation, in which the toe plate is arranged generally parallel with a surface underlying the wheel unit and the load support, to a first-stage, laid back orientation, in which a front end of the toe plate is lifted away from the surface while a rear end of the toe plate remains planted on the surface, and for pivotable motion about a wheel axis defined by the axle and spaced apart from the load-assist axis from the first-stage, laid-back orientation to a second-stage, laid-back orientation, in a load-assist mode, and a mode changer configured to selectively block movement of the load support relative to the wheel unit from the upright orientation to the first-stage, laid back orientation so that the load support pivots only about the wheel axis during tilting of the load support from the upright orientation to a laid-back, unassisted orientation, in which the toe plate is lifted away from the surface so that the wheels can roll across the surface in a normal-lift mode, the mode changer including an axle retainer coupled to the support frame, a first axle motion-blocker with a return motion-blocking surface coupled to the axle retainer, a load-assist activation pedal coupled to the axle retainer, and a pedal motion-transfer link coupled to the first axle motion-blocker and the load-assist activation pedal to cause pivoting motion of the first axle motion-blocker and the pedal motion-transfer link about an axle-retainer pivot axis upon receipt of a load-assist activation force on the load-assist activation pedal to move the axle retainer from an engaged position to a disengaged position, wherein the axle is configured to travel through the first arcuate guide slot as the load transporter moves from the upright orientation to the first-stage, laid-back orientation in the load-assist mode, the return motion-blocking surface configured to block the axle retainer from returning to the engaged position until the load transporter reaches the upright orientation, the return motion-blocking surface having a curved profile tracking a curve of the first arcuate guide slot.

16. The load transporter of claim 15, wherein the load-assist activation pedal is engagable selectively by a user to pivot the axle retainer about the axle-retainer pivot axis from the engaged position, in which the axle retainer engages the axle of the wheel unit and blocks movement of the load support relative to the wheel unit from the upright orientation to the first-stage, laid back orientation, to the disengaged position, in which the axle retainer allows movement of the load support relative to the wheel unit from the upright orientation to the first-stage, laid back orientation.

17. The load transporter of claim 16, wherein the mode changer further includes a load-assist release pedal coupled to the load support for pivotable movement relative to the load support between a released position, in which the axle retainer is free to move from the engaged position to the disengaged position, and a locked position, in which the load-assist release pedal engages the axle retainer and blocks the axle retainer from moving from the disengaged position to the engaged position.

18. The load transporter of claim 17, wherein the axle retainer is biased toward the engaged position and the load-assist release pedal is biased toward the locked position.

19. The load transporter of claim 17, wherein the axle retainer further includes a second axle motion-blocker, the first axle motion-blocker is coupled to a first end of the pedal motion-transfer link and the second axle motion blocker is coupled to an opposite, second end of the pedal motion-transfer link.

20. The load transporter of claim 15, wherein the support frame includes a second load-support bracket coupled to at least one of the toe plate and the frame foundation and formed to include a second arcuate guide slot, and wherein the axle is received in the first and second arcuate guide slots.

\* \* \* \* \*